(12) United States Patent
Lee et al.

(10) Patent No.: US 7,909,259 B2
(45) Date of Patent: Mar. 22, 2011

(54) PRESSURE ACTIVATED PASSIVE RFID TAG

(75) Inventors: Hae Dong Lee, Daejeon (KR); Doo Ho Choi, Cheonan-si (KR); Kyo Il Chung, Daejeon (KR); Hyunsook Cho, Daejeon (KR)

(73) Assignee: Electronics and Telecommunication Research Institute, Daejeon (KR)

( * ) Notice: Subject to any disclaimer, the term of this patent is extended or adjusted under 35 U.S.C. 154(b) by 0 days.

(21) Appl. No.: 12/537,389

(22) Filed: Aug. 7, 2009

(65) Prior Publication Data
US 2010/0140361 A1    Jun. 10, 2010

(30) Foreign Application Priority Data
Dec. 8, 2008  (KR) .................. 10-2008-0124203

(51) Int. Cl.
*G06K 19/06* (2006.01)
*G06K 19/00* (2006.01)

(52) U.S. Cl. ..... 235/492; 235/487; 340/10.1; 340/572.1

(58) Field of Classification Search .................. 235/487, 235/492; 340/10, 572
See application file for complete search history.

(56) References Cited

U.S. PATENT DOCUMENTS

| | | | |
|---|---|---|---|
| 6,343,744 B1 * | 2/2002 | Shibata et al. | 235/492 |
| 7,151,455 B2 * | 12/2006 | Lindsay et al. | 340/572.3 |
| 2003/0132301 A1 * | 7/2003 | Selker | 235/487 |
| 2006/0289657 A1 * | 12/2006 | Rosenberg | 235/492 |
| 2007/0152828 A1 * | 7/2007 | Mohalik | 340/572.3 |
| 2008/0054078 A1 * | 3/2008 | Tanner | 235/492 |

FOREIGN PATENT DOCUMENTS

| | | |
|---|---|---|
| KR | 1020070053471 | 5/2007 |
| KR | 1020080079143 | 8/2008 |

* cited by examiner

*Primary Examiner* — Daniel A Hess
*Assistant Examiner* — Matthew Mikels
(74) *Attorney, Agent, or Firm* — EuiHoon Lee, Esq.

(57) ABSTRACT

Provided is an RFID tag. When no external pressure is applied to a packaging structure, a wire for transmitting power and data from an antenna is separated from an RFID chip by an air layer. When external pressure is applied to the packaging structure, the wire is connected to the RFID chip to transmit the power and data between the antenna and the RFID chip.

6 Claims, 5 Drawing Sheets

(a)

(b)

PRESSURE ACTIVATED PASSIVE RFID TAG

CROSS-REFERENCE TO RELATED APPLICATION

This application claims priority to and the benefit of Korean Patent Application No. 10-2008-0124203 filed in the Korean Intellectual Property Office on Dec. 8, 2008, the entire contents of which are incorporated herein by reference.

BACKGROUND OF THE INVENTION (a) Field of the Invention

The present invention relates to a radio frequency identification (RFID) tag. Particularly, the present invention relates to a card-type RFID tag.

(b) Description of the Related Art

A conventional radio frequency identification (RFID) chip, particularly a passive RFID chip with no power source, has minimal computing and communication performance and it can be easily hacked because of its poor security function. That is, the chip can be hacked by using an RFID reader a simple attack, so the privacy of a user possessing the RFID tag can be infringed.

Particularly, when the RFID tag is applied to the ID card field for identifying individuals, they can be identified by using the RFID tag.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an RFID tag for preventing a user's privacy from being infringed by reinforcing security in the case of using an RFID tag.

An exemplary embodiment of the present invention provides a radio frequency identification (RFID) tag including: an antenna for generating power from a signal received from an RFID reader; a wire having a first terminal connected to the antenna and a second terminal that is cut; an RFID chip for transmitting/receiving data to/from the RFID reader by using the power; and a packaging structure including the antenna, the wire, and the RFID chip, wherein the wire and the RFID chip are separated by an air layer when no external pressure is applied to the packaging structure, and a partial area of the wire is connected to the RFID chip when external pressure is applied to the packaging structure.

Another embodiment of the present invention provides a radio frequency identification (RFID) tag including: an antenna for generating power from a signal received from an RFID reader; a first wire having a first terminal connected to the antenna and a second terminal that is cut; an RFID chip for transmitting/receiving data to/from the RFID reader by using the power; a second wire having a first terminal connected to the RFID chip and a second terminal that is cut; and a packaging structure including the antenna, the first wire, the second wire, and the RFID chip, wherein the first wire and the second wire are separated by an air layer when no external pressure is applied to the packaging structure, and a partial area of the first wire is connected to the second wire when external pressure is applied to the packaging structure.

Yet another embodiment of the present invention provides a radio frequency identification (RFID) tag including: an antenna for generating power from a signal received from an RFID reader; a wire having a first terminal connected to the antenna and a second terminal that is cut; an RFID chip for transmitting/receiving data to/from the RFID reader by using the power; an elastic body of elastic material; and a packaging structure including the antenna, the wire, the RFID chip, and the elastic body, wherein the wire and the RFID chip are separated by the elastic body when no external pressure is applied to the packaging structure, and a partial area of the wire is connected to the RFID chip when the external pressure is applied to the packaging structure.

DETAILED DESCRIPTION OF THE EMBODIMENTS

Figure 1:
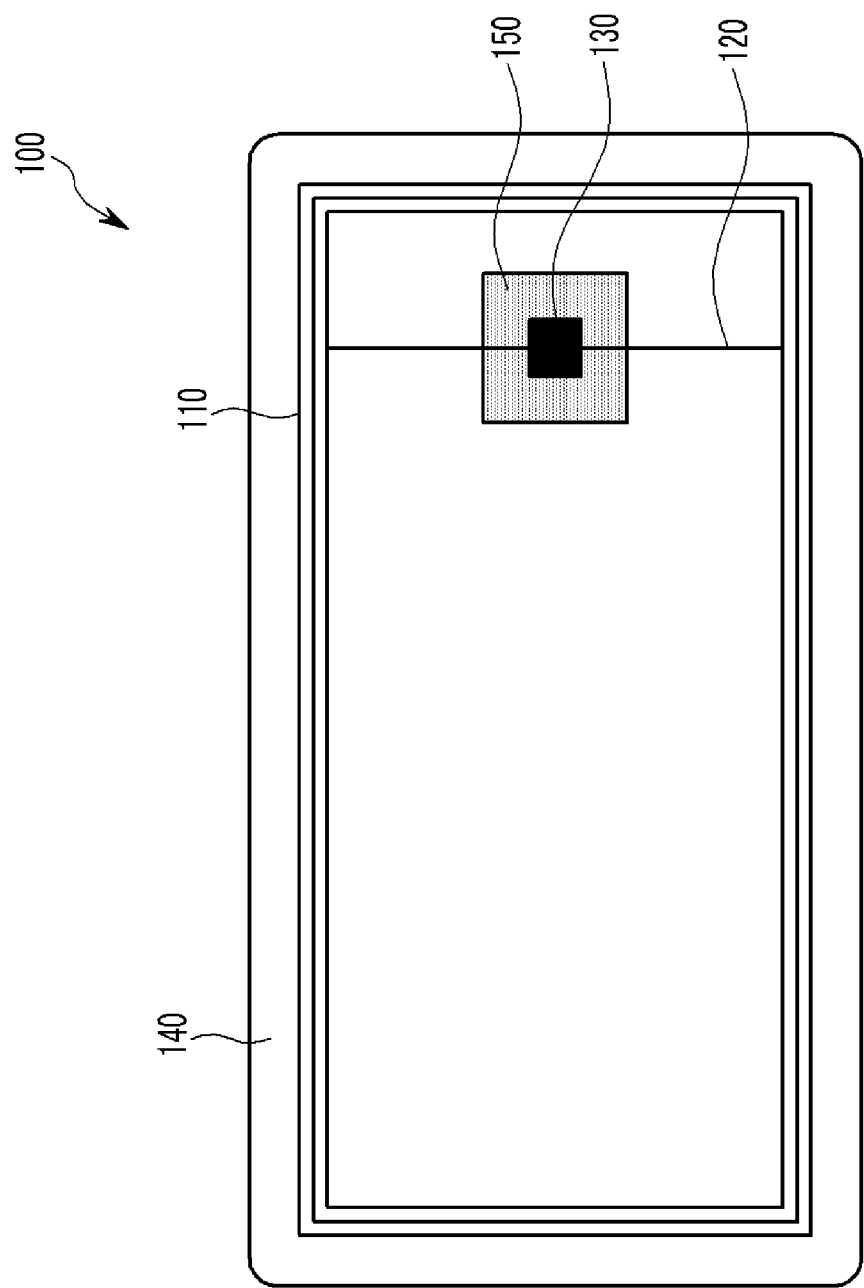
FIG. 1 shows an internal configuration of a card-type RFID tag according to an exemplary embodiment of the present invention, illustrating a passive RFID tag.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

Throughout the specification, unless explicitly described to the contrary, the word "comprise" and variations such as "comprises" or "comprising" will be understood to imply the inclusion of stated elements but not the exclusion of any other elements.

An RFID tag according to an exemplary embodiment of the present invention will now be described in detail with reference to accompanying drawings.

FIG. 1 shows an internal configuration of a card-type RFID tag according to an exemplary embodiment of the present invention, illustrating a passive RFID tag.

The RFID tag 100 includes an antenna 110, a wire 120, an RFID chip 130, and a packaging structure 140.

The antenna 110 outputs power generated from a signal received from an RFID reader (not shown) and data included in the signal. Regarding the antenna 110, in order to generate power for driving the RFID chip 130 from the received signal, a conductive material for generating magnetic force is spirally patterned in circles or quadrangles in the packaging structure 140.

The wire 120 that is conductive material for transmitting the power and data output by the antenna 110 is provided in the packaging structure 140, and a first terminal thereof is connected to the antenna 110 and a second terminal thereof is cut.

The RFID chip 130 transmits/receives data to/from the RFID reader by using the power generated by the antenna 110, and it is provided in the packaging structure 140.

The wire 120 and the RFID chip 130 are separated from each other by an air layer 150 when no external pressure is applied to the packaging structure 140 in the exemplary embodiment of the present invention. On the other hand, when external pressure is applied to the packaging structure 140, a partial area of the wire 120 is connected to the RFID chip 130 so that the power and data output by the antenna 110 are transmitted to the RFID chip 130. The external pressure is exemplarily generated when the user presses the external part of the packaging structure 140 in the exemplary embodiment of the present invention, and the pressure applied to the external part of the packaging structure 140 can also be used as external pressure in the embodiment of the present invention.

The packaging structure 140 is a structure formed with the installation of the antenna 110, the wire 120, and the RFID chip 130, and it is configured with various forms and materials depending on its applications. For example, when the RFID tag is used for an ID card, it is flat. In the exemplary embodiment of the present invention, a molding method is used to form the packaging structure 140, and without being restricted to this, it is possible in the embodiment of the present invention to form the packaging structure 140 by using another method.

When the external pressure is applied to a predetermined area of the packaging structure 140, the corresponding area is bent and applies pressure a partial area of the wire 120 so that the partial area of the wire 120 may be connected to the RFID chip 130. However, when the external pressure is no longer applied, the area is restored to the previous state by elasticity of the packaging structure 140 and the application of pressure to the partial area of the wire 120 is stopped so that the wire 120 may be separated from the RFID chip 130. In this case, the top surface of the wire 120 is designed to be adhered to the packaging structure 140 so that the packaging structure 140 is restored and the wire 120 is restored to the previous state in which the external pressure is not applied.

As described, when the RFID tag 100 is used, the external pressure is applied to the packaging structure 140 to activate the RFID chip 130, and when the RFID tag 100 is not used, the power and data transmitted to the RFID chip 130 is intercepted to prevent undesired communication between the RFID tag 100 and the RFID reader.

Figure 2:
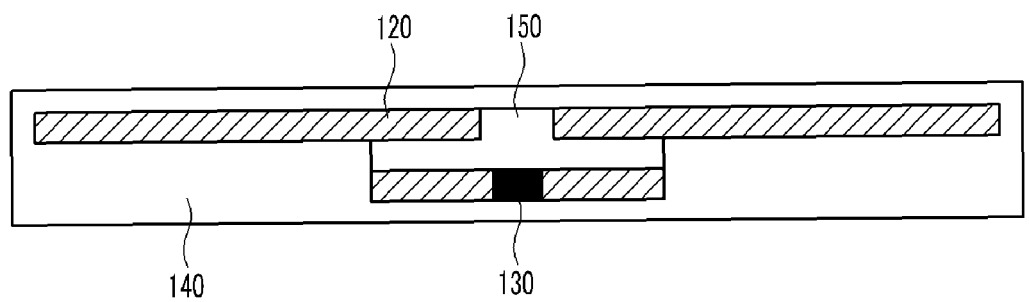
FIG. 2 shows a lateral view of an RFID tag card according to an exemplary embodiment of the present invention, illustrating the inactive communication state between an RFID chip and an RFID reader.

FIG. 2 shows a lateral view of an RFID tag card according to an exemplary embodiment of the present invention, illustrating the inactive communication state between an RFID chip and an RFID reader.

Referring to FIG. 2, when no external pressure is applied, a partial area corresponding to the second terminal of the wire 120 is provided in parallel with the RFID chip 130 with the air layer 150 therebetween in the packaging structure 140. Accordingly, the wire 120 and the RFID chip 130 are separated by the air layer 150.

Figure 3:
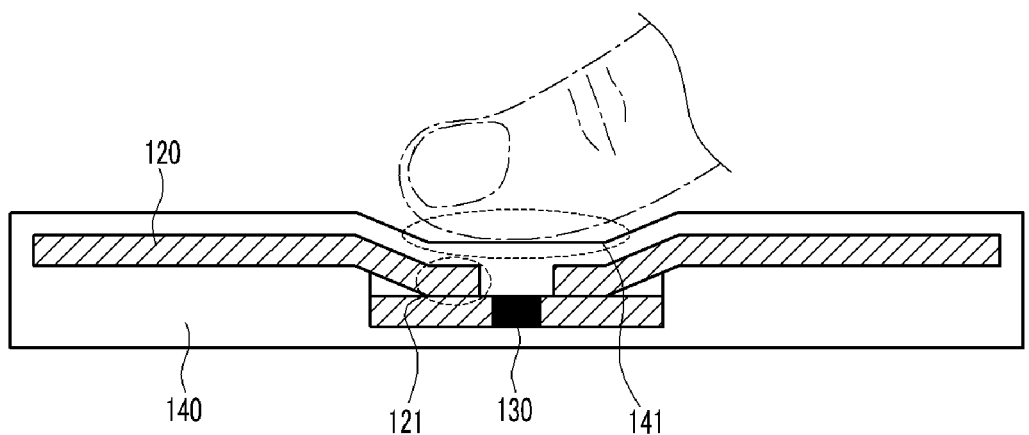
FIG. 3 and FIG. 4 show lateral views of an RFID tag card according to an exemplary embodiment of the present invention, illustrating the active communication state between an RFID chip and an RFID reader.
Figure 4:
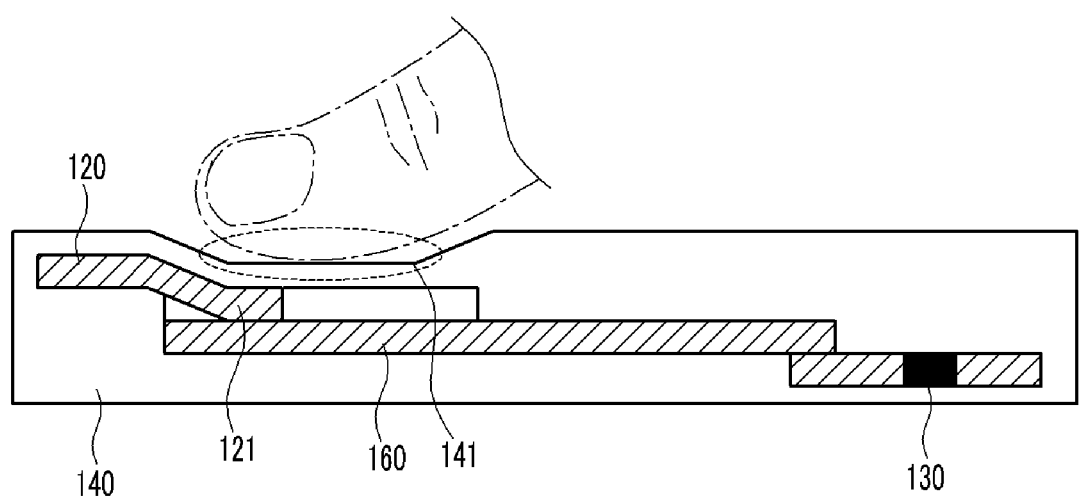
Figure 5:
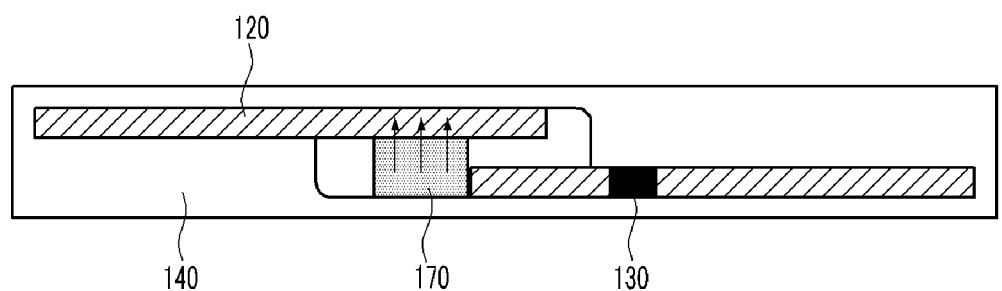
FIG. 5 shows a lateral view of an RFID tag card including an elastic body according to an exemplary embodiment of the present invention.
Figure 5:
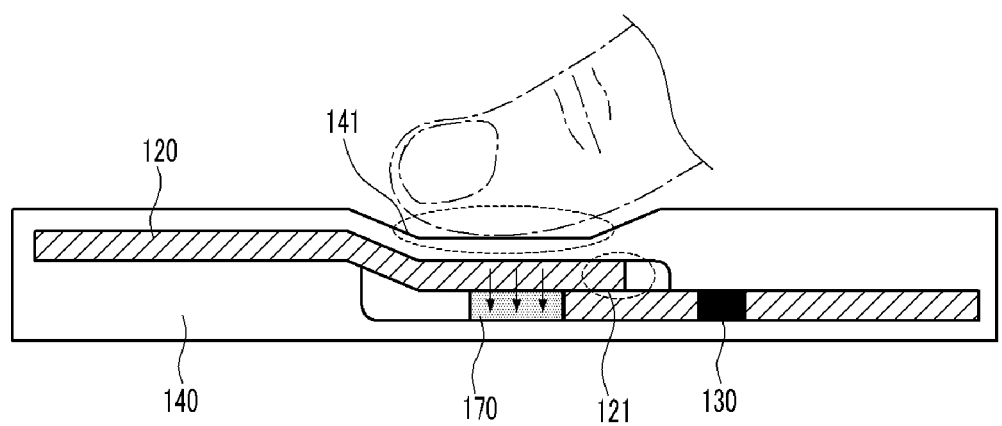

FIG. 3 and FIG. 4 show lateral views of an RFID tag card according to an exemplary embodiment of the present invention, illustrating the active communication state between an RFID chip and an RFID reader. FIG. 5 shows lateral views of an RFID tag card including an elastic body according to an exemplary embodiment of the present invention, showing the state (a) in which external pressure is not applied and the state (b) in which external pressure is applied.

Referring to FIG. 3, external pressure is applied to the packaging structure 140 so that a partial area 141 is bent. The bent partial area 141 puts pressure on the wire 120 so that a partial area 121 of the wire 120 may be connected to the RFID chip 130.

As shown in FIG. 3, the wire 120 has been described to be directly connected to the RFID chip 130 by external pressure applied to the packaging structure 140, and other types of realization are also allowable in the present invention. For example, it is also possible that, as shown in FIG. 4, when the external pressure is applied, the first terminal is connected to the RFID chip 130 and the partial area 121 of the wire 120 may be connected to another wire 160 with the cut second terminal. In this case, direct application of the external pressure to the RFID chip 130 is prevented to thus avoid damage to the RFID chip 130 that may occur because of pressurization.

Also, as shown in FIG. 2 to FIG. 4, when the applying of the external pressure is stopped, the packaging structure 140 is restored to the previous state because of its elasticity and applying pressure to the wire 120 is stopped so that the wire 120 is separated from the RFID chip 130, and other types of realization are allowable in the present invention. For example, it is also possible, as shown in FIG. 5, that when applying of the external pressure is stopped, the wire 120 becomes separated from the RFID chip 130 by pressurizing the wire 120 in the opposite direction to that of the external pressure according to elasticity of an elastic body 170 installed in the packaging structure 140. In this case, a problem in which the wire 120 is connected to the RFID chip 130 while no external pressure is applied due to frequent applying of pressure can be prevented. Here, the elastic body 170 represents a material with elasticity such as spring or gum.

According to an embodiment of the present invention, communication between an unnecessary RFID tag and an RFID reader can be reduced while using the RFID tag, and hence, the security for protecting card information from hacking is reinforced, thereby preventing privacy infringement.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A radio frequency identification (RFID) tag comprising:
   an antenna for generating power from a signal received from an RFID reader;
   a wire having a first terminal connected to the antenna and a second terminal that is cut, wherein a first surface of the first wire is adhered to a partial area of the packaging structure;
   an RFID chip for transmitting/receiving data to/from the RFID reader by using the power; and
   a packaging structure including the antenna, the wire, and the RFID chip, wherein the wire and the RFID chip are separated by an air layer that is provided over the RFID chip when no external pressure is applied to the packaging structure, wherein when external pressure is applied to the packaging structure, a partial area of the wire is connected to the RFID chip by pressure generated by the packaging structure bent by the external pressure, and when the external pressure is stopped, the partial area of the bent packaging structure is restored and the wire is separated from the RFID chip by the first surface adhered to the partial area of the bent packaging structure.

2. The RFID tag of claim 1, wherein the partial area of the packaging structure bent by the external pressure applies pressure to a partial area of the wire to connect the partial area of the wire to the RFID chip.

3. A radio frequency identification (RFID) tag comprising:

an antenna for generating power from a signal received from an RFID reader;

a first wire having a first terminal connected to the antenna and a second terminal that is cut, a first surface of the first wire is adhered to a partial area of the packaging structure;

an RFID chip for transmitting/receiving data to/from the RFID reader by using the power;

a second wire having a first terminal connected to the RFID chip and a second terminal that is cut; and a packaging structure including the antenna, the first wire, the second wire, and the RFID chip, wherein the first wire and the second wire are separated by an air layer that is provided over the second wire when no external pressure is applied to the packaging structure, wherein when external pressure is applied to the packaging structure, a partial area of the first wire is connected to the second wire by pressure generated by the packaging structure bent by the external pressure, and when the external pressure is stopped, the partial area of the bent packaging structure is restored and the first wire is separated from the RFID chip by the first surface adhered to the partial area of the bent packaging structure.

4. A radio frequency identification (RFID) tag comprising:

an antenna for generating power from a signal received from an RFID reader;

a wire having a first terminal connected to the antenna and a second terminal that is cut, a first surface of the wire is adhered to a partial area of the packaging structure;

an RFID chip for transmitting/receiving data to/from the RFID reader by using the power;

an elastic body of elastic material; and a packaging structure including the antenna, the wire, the RFID chip, and the elastic body, wherein the wire and the RFID chip are separated by the elastic body when no external pressure is applied to the packaging structure, wherein when external pressure is applied to the packaging structure, a partial area of the wire is connected to the RFID chip by pressure generated by the packaging structure bent by the external pressure, and when the external pressure is stopped, the partial area of the bent packaging structure is restored and the wire is separated from the RFID chip by the first surface adhered to the partial area of the bent packaging structure.

5. The RFID tag of claim 1, wherein the partial area of the wire is directly connected to the RFID chip when external pressure is applied to the packaging structure.

6. The RFID tag of claim 4, wherein the partial area of the wire is directly connected to the RFID chip when external pressure is applied to the packaging structure.

* * * * *